(12) United States Patent
Zhang et al.

(10) Patent No.: US 10,591,927 B2
(45) Date of Patent: Mar. 17, 2020

(54) SMART MOBILE DETECTION PLATFORM FOR GREENHOUSE

(71) Applicant: JIANGSU UNIVERSITY, Jiangsu (CN)

(72) Inventors: Xiaodong Zhang, Jiangsu (CN); Hanping Mao, Jiangsu (CN); Hongyan Gao, Jiangsu (CN); Zhiyu Zuo, Jiangsu (CN); Baijing Qiu, Jiangsu (CN); Hongtao Zhang, Jiangsu (CN); Yixue Zhang, Jiangsu (CN)

(73) Assignee: JIANGSU UNIVERSITY, Jiangsu (CN)

( * ) Notice: Subject to any disclaimer, the term of this patent is extended or adjusted under 35 U.S.C. 154(b) by 328 days.

(21) Appl. No.: 15/742,692

(22) PCT Filed: Dec. 18, 2015

(86) PCT No.: PCT/CN2015/097788
§ 371 (c)(1),
(2) Date: Jan. 8, 2018

(87) PCT Pub. No.: WO2017/004943
PCT Pub. Date: Jan. 12, 2017

(65) Prior Publication Data
US 2018/0203458 A1    Jul. 19, 2018

(30) Foreign Application Priority Data
Jul. 8, 2015    (CN) .......................... 2015 1 0398869

(51) Int. Cl.
*G05D 1/02*    (2020.01)
*B60G 3/00*    (2006.01)
(Continued)

(52) U.S. Cl.
CPC ............. *G05D 1/0246* (2013.01); *A01G 9/14* (2013.01); *A01G 9/143* (2013.01); *B60G 3/00* (2013.01);
(Continued)

(58) Field of Classification Search
None
See application file for complete search history.

(56) References Cited

U.S. PATENT DOCUMENTS

2009/0224501 A1    9/2009    Carlson et al.
2017/0131718 A1*   5/2017    Matsumura .............. G05D 1/02

FOREIGN PATENT DOCUMENTS

CN    102384767 A    3/2012
CN    102754538 A    10/2012
(Continued)

*Primary Examiner* — Richard M Camby
(74) *Attorney, Agent, or Firm* — Saliwanchik, Lloyd & Eisenschenk (57) ABSTRACT

A smart mobile detection platform for a greenhouse comprises a frame, a front suspension assembly, a rear suspension assembly, a power assembly and a drive assembly for driving a mobile platform to move, a steering system for controlling the mobile platform to steer, an automatic-cruising pose-detection sensor module needed for automatic mobile platform cruising, a greenhouse environment and crop detection image sensor module (29), a signal collection module (30) for collecting a sensor signal, a central control system for controlling the mobile platform to move, an information transmission module, and a power module for supplying power to the whole mobile platform. By means of a central control system, a mobile platform completes automatic inspection of the greenhouse environment and crop growth information, and an automatic charging device provides supplemental electric energy to the mobile platform, thereby improving detection efficiency and accuracy.

8 Claims, 3 Drawing Sheets

(51) Int. Cl.
*B60K 1/00* (2006.01)
*A01G 9/14* (2006.01)
*B60G 3/20* (2006.01)
*G05D 1/00* (2006.01)

(52) U.S. Cl.
CPC .................. *B60G 3/20* (2013.01); *B60K 1/00* (2013.01); *G05D 1/0094* (2013.01); *G05D 1/0255* (2013.01); *B60G 2200/144* (2013.01); *B60Y 2200/22* (2013.01); *G05D 2201/0201* (2013.01); *G05D 2201/0207* (2013.01); *Y02A 40/252* (2018.01)

(56) References Cited

FOREIGN PATENT DOCUMENTS

| | | | |
|---|---|---|---|
| CN | 103147416 | A | 6/2013 |
| CN | 103264730 | A | 8/2013 |
| CN | 103404379 | A | 11/2013 |
| CN | 103487812 | A | 1/2014 |
| CN | 103488173 | A | 1/2014 |
| CN | 203646874 | A | 6/2014 |
| CN | 103979057 | A | 8/2014 |
| CN | 104002668 | A | 8/2014 |
| CN | 203876870 | U | 10/2014 |
| CN | 203902283 | U | 10/2014 |
| CN | 203921088 | U | 11/2014 |
| CN | 104991559 | A | 10/2015 |
| CN | 105021225 | A | 11/2015 |
| FR | 2820709 | A1 | 8/2002 |

\* cited by examiner

SMART MOBILE DETECTION PLATFORM FOR GREENHOUSE

CROSS REFERENCE TO RELATED APPLICATIONS

This application is a National Stage Application of International Application Number PCT/CN2015/097788, filed Dec. 18, 2015; which claims priority to Chinese Application No. 201510398869.0, filed Jul. 8, 2015.

FIELD OF THE INVENTION

The present invention belongs to the field of smart agricultural machinery and relates to a smart detection platform for detecting facility environment and crop growth information, in particular to a smart mobile detection platform for greenhouse.

BACKGROUND OF THE INVENTION

With more than 4 million hectares of facilities in China, it is at the forefront of the world. With the rapid development of large-scale, modern and smart greenhouses, how to increase the crop output and quality of the greenhouse, improve the efficiency of resource utilization and make China transform from facility big power into facility great power will become the key issue for the development of our facilities at present. The regulation and control of facility environment in China started relatively late. The traditional control method relies on artificial experience or control of the set value of environmental factor. Due to lack of the information feedback element of crop growth and failure to control according to the actual needs of crops, the output and quality potential of crops have not been tapped fully. At present, the testing equipment for greenhouse environment is mostly distributed layout. Owing to lack of the advanced and applicable platform for facility growth and environmental monitoring, the detection of crop growth information in the facility is still in the research stage of the laboratory. In the present invention, a smart mobile detection platform is used for automatic cruise monitoring of crop growth and environmental information. Because of its mobility, the repetitive inputs of greenhouse detection equipment can be greatly reduced by automatic cruise detection in the multi-greenhouse sharing way, thereby reducing costs, and improving the utilization efficiency of equipment. At the same time, owing to the application of the timing automatic cruise monitoring in the smart mobile detection platform, personnel investments are reduced greatly, thereby effectively avoiding the operational errors of personnel and improving the detection accuracy and work efficiency of greenhouse environment and crop growth information.

The current smart mobile platforms for the facilities mainly include tracked, wheeled and combined type mobile platforms. The invention patent application with application No. 201310192634.7 discloses a mobile platform for a tracked robot. A control module controls a driving wheel train and a driven wheel train to drive the running of a vehicle body in accordance with the data signal of a monitoring module. The tracked robot cannot filter the bump of rugged roads, due to its rigid connections of the track, wheel trains and vehicle body, resulting in damage to detection equipment mounted on the mobile platform and influence on the stability of detection.

The invention patent application with application No. 201420313952.4 discloses a robot platform with a suspension, which comprises a chassis main body, a wheel train structure and other components, wherein the wheel train structure has an independent suspension structure consisting of a suspension swing arm, a shock absorber, a final-stage reducer, a motor and wheels; the suspension structure enables the robot to adapt to a certain rugged surface, making it travel more smoothly at high speed, thereby reducing the vibration caused by the rugged surface of the robot main body during the movement and avoiding chassis overturning or damage to the carried devices caused by bump. The mobile platform with the suspension is in the three-wheel design. For detection equipment carried on the mobile platform for horizontal movement and vertical lifting, in the horizontal movement and vertical lifting processes, and especially the process that the large swing arm drives a sensor module to extend above the crops for overlooking spectra and images and detecting canopy temperature, the center of gravity of the mobile platform is changed substantially, resulting in deviation of the center of gravity from the platform. As the equipment is not specifically designed for these conditions, it will be prone to dumping, and it is difficult to meet the need that the crop growth and environmental monitoring of facilities should be carried with the mechanism with large-range horizontal and vertical lifting.

The invention patent application with application No. 201310408112.6 discloses a multi-terrain smart mobile platform for detection, comprising an autonomous forward four-wheel trolley system and a four-axle wing rotor flight system, wherein both are connected by a locking system and are in communication with a PC terminal through a ZigBee wireless transmission network. The autonomous forward four-wheel trolley system, using Arduino, controls a vehicle-mounted multi-parameter sensor module, a driving module and the like; and the four-axle wing rotor flight system, using Arduino, controls an onboard multi-parameter sensor module, a high-speed driving module and the like. In the event of impenetrable obstacles, the locking system can be automatically unlocked, thereby triggering the operation of the four-axle wing rotor flight system. Whether there is a four-wheel mode or an airplane mode for the multi-terrain combined type smart mobile platform, the overall stability of the mobile platform is poorer than that of the mobile platform with the independent suspension. When starting the airplane mode, the quality of detection equipment carried on the mobile platform shall be distributed evenly, and there is a limit to the weight of the carried detection equipment. Compared with the single-mode mobile platform, the multi-terrain combined type smart mobile platform has a complicated structure and high price.

In summary, the device and method of the existing smart mobile platform cannot be applied to monitoring the crop growth information of facilities due to different detection objects and task objectives, and cannot meet that the detection equipment carried on the growth monitoring system for facilities need to overcome the overturning risk of the mobile platform due to substantial change in the center of gravity of the mobile platform resulting from the lifting and horizontal movement of the swing arm and the requirement of crop growth information detection equipment on the cruise accuracy and stability of the platform under the greenhouse condition and environment.

CONTENT OF THE INVENTION

The present invention aims to provide a smart mobile detection platform for a greenhouse, which realizes the simultaneous detection of images, spectra, infrared temperature of crops and ambient illumination, temperature and humidity and realizes the timed cruise detection of the crop growth and environment information of the greenhouse.

In order to achieve the above object, the technical solution adopted by the present invention is as follows:

A smart mobile detection platform for a greenhouse, comprising a frame, a front suspension assembly, a rear suspension assembly, a power assembly, a drive assembly, a steering system, an automatic-cruising pose-detection sensor module, a greenhouse environment and crop detection image sensor module, a signal collection module, a central control system, an information transmission module and a power module, wherein the frame is welded by square tubes; the front suspension assembly is arranged at a groove in front of the frame; the rear suspension assembly is arranged in a groove at the rear of the frame; the power assembly is arranged at the rear of a middle compartment; the drive assembly is arranged in the center of the rear suspension assembly; the steering system is arranged at the front of the frame; the automatic-cruising pose-detection sensor modules are respectively fixed at the front and rear and on left and right sides of the frame; the greenhouse environment and the crop detection image sensor module and a laser sensor are respectively fixed on the right side of the frame; the power module is fixed on the front of the compartment; the signal collection module, the central control system and the information transmission module are fixed on the power module; the central control system is respectively connected with the signal collection module, the information transmission module, the steering system and the power assembly via a data cable; the signal collection module is connected with the sensor module via a data cable; and the power module is respectively connected with the central control system, the signal collection module, the information transmission module, the sensor module, the steering system and the power assembly via a power cord.

The frame is welded by the square tubes; the groove at the front of the frame is welded with an installed frame suspension support and a frame shock absorber support respectively, for connecting the suspension and the shock absorber; the frame suspension support and the frame shock absorber support which are in welded connection with the frame are bilaterally symmetrical along the center of the width of the frame; the mounting positions of the frame suspension support and the frame shock absorber support in the groove at the rear of the frame are the same as those in the groove at the front of the frame; an ultrasonic sensor C, a camera and a steering engine are installed inside the groove at the front of the frame; a 12V lithium battery, a 5V power converter, a 6V power converter, the signal collection module, an industrial personal computer, a driving module, a stepper motor for the wireless transmitting and receiving module, a reducer, the greenhouse environment and crop detection image sensor module are arranged at the middle compartment of the frame; a differential gear and an ultrasonic sensor D are arranged inside the groove at the rear of the frame; and an ultrasonic sensor A and an ultrasonic sensor B for preventing the mobile platform against deviation from the route are arranged on both sides of the frame.

The front suspension assembly comprises an upper cantilever A, a lower cantilever A, a steering knuckle, a shock absorber A and a tire A; the upper cantilever A and the lower cantilever A are connected with the frame suspension support via bolts; the steering knuckle is connected with the upper cantilever A and the lower cantilever A respectively; the shock absorber A is connected with a shock absorber support A and the frame shock absorber support respectively; the tire A is arranged on the steering knuckle and is fixed by a stepped shaft and nuts on the steering knuckle; a rolling bearing is arranged inside the tire A so that the tire A can roll; and the front suspension assembly is bilaterally symmetrical along the center of the width of the frame;

The rear suspension assembly comprises an upper cantilever B, a lower cantilever B, a C-shaped support, a shock absorber B and a tire B; the upper cantilever B and the lower cantilever B are connected with the frame suspension support by the bolts; the C-shaped support is connected with the upper cantilever B and the lower cantilever B through bolts respectively; the shock absorber B is connected with a shock absorber support B and the frame shock absorber support through the bolts; a rolling bearing is arranged in a hollow circular pipe outside the C-shaped support; the tire B is connected with a transmission half shaft; and the rear suspension assembly is bilaterally symmetrical along the center of the width of the frame;

The power assembly comprises the stepper motor, the reducer, a motor support and a universal coupling A; the motor support is arranged on the frame; the stepper motor and the reducer are connected via the bolts and arranged on the motor support; and one end of the universal coupling A is arranged on an output shaft of the reducer;

The drive assembly comprises a differential gear and a transmission half shaft; an input shaft of the differential gear is connected with an output shaft of the reducer through a universal coupling B; and the output shaft of the differential gear is connected with the tire B through the transmission half shaft;

The steering system comprises a steering engine and a steering track rod; the steering track rod is connected with the steering knuckle through the bolts; and the steering engine is connected to the center of the steering track rod;

The automatic-cruising pose-detection sensor module comprises the ultrasonic sensor A arranged on the left side of the frame, the ultrasonic sensor B on the right side, the ultrasonic sensor C at the front, the ultrasonic sensor D at the rear, the camera at the front and the laser sensor on the right side of the frame.

The greenhouse environment and crop detection image sensor module comprises a temperature sensor, a humidity sensor, a light sensor, a carbon dioxide concentration sensor and an industrial camera, for collecting greenhouse environment and crop image information;

The signal collection module comprises a data collection card and a video image collection card, for collecting the sensor signal and transmitting the signal to the industrial personal computer;

The central control system comprises the industrial personal computer and the driving module, the industrial personal computer is connected with the driving module through the data cable, which is used for controlling the movement of the mobile platform.

The information transmission module comprises two groups of wireless transmitting and receiving modules, the two groups of wireless transmitting and receiving modules are respectively connected with the industrial personal computer and a remote computer, and are in wireless transmission through GPRS.

The power module comprises a 12V lithium battery, a 5V power converter and a 6V power converter, the power converter is used for converting 12V voltage into 5V and 6V voltages respectively, the converted 5V and 6V voltages and the 12V voltage supplied by the 12V lithium battery are respectively connected with electrical modules with the required 5V, 6V and 12V voltages through the power cord to provide power for the electrical part of the entire mobile platform.

The method for automatic-cruising detection of greenhouse environment and crop growth information by the smart movement detection platform comprising the following steps that:

1. a power button on the mobile platform is started, the system carries out self-inspection, equipment runs properly, the mobile platform starts to operate and starts from the initial position;
2. the mobile platform enters into a soil-bin according to the preset automatic cruise planning route, the ultrasonic sensors on the left and right sides of the mobile platform simultaneously detect the distances of the mobile platform from the soil-bin on the left side and the soil-bin on the right side, when the difference between distance detected by the ultrasonic sensor A on the left side and distance detected by the ultrasonic sensor B on the right side exceeds a preset value and the value is negative, the central control system sends an instruction to the steering engine, and the steering engine is deflected to a corresponding angle according to the distance difference, making the steering system turn to the right, when the distance difference detected by the ultrasonic sensors on left and right sides indicates that the mobile platform is going to enter the normal cruise track, the central control system sends an instruction again to the steering engine to make the steering engine return, achieving steering reversal, when the difference between distance detected by the ultrasonic sensor A on the left side and distance detected by the ultrasonic sensor B on the right side exceeds a preset value and the value is positive, the central control system sends an instruction to the steering engine, and the steering engine is deflected to a corresponding angle according to the distance difference, making the steering system turn to the left, when the distance difference detected by the ultrasonic sensors on left and right sides indicates that the mobile platform is going to enter the normal cruise track, the central control system sends an instruction again to the steering engine to make the steering engine return, achieving steering reversal;
3. a laser reflector is arranged on the lateral surface of each crop at a certain distance from the direction of travel, when the laser sensor on the right side of the mobile platform receives the reflected signal, the central control system sends an instruction to the stepper motor, making the stepper motor slow down and stop running, and reversely brake to reach the preset detection position, at the same time the central control system controls the detection equipment carried on the mobile platform to begin to detect the growth information of the crops, after completing a series of detection works, the detection equipment transmits the completion signal to the central control system, the central control system drives the stepper motor again according to the received signal to move the mobile platform forward, when laser sensor on the right side of the mobile platform receives the reflected signal again, the mobile platform stops, and the carried detection equipment starts to detect crops to realize automatic cruise;
4. the greenhouse environment and the crop detection image sensor module on the right side of the mobile platform collects temperature, humidity, light, carbon dioxide concentration and crop image information at the detection position when the mobile platform stops, transmits the signal through the signal collection module to the central control system, draws the distribution map of greenhouse environmental information, and analyzes the information of crop growth, providing the basis for environmental regulation and control;
5. when distance detected by the ultrasonic sensor C in front of the mobile platform is less than the preset safety value, the central control system controls the stepper motor to stop operating according to the received signal, indicating that the platform has reached the detection boundary in the front and that cruise on this row of soil-bin has been completed and there are no crops to be detected; and the central control system controls the stepper motor to rotate reversely, making the mobile platform reverse, when the mobile platform reverses, the ultrasonic sensors on both sides of the mobile platform continue to detect distance of the left and right sides from the soil-bins, and its steering direction is exactly opposite to the forward direction, the control rule of the motion of the traveling track is opposite to that when traveling forward; when the difference between distance detected by the ultrasonic sensor A on the left side and distance detected by the ultrasonic sensor B on the right side exceeds the preset value and the value is negative, the central control system sends an instruction to the steering engine, and the steering engine is deflected to the corresponding angle according to the distance difference, making the steering system turn to the left, when the distance difference detected by the ultrasonic sensors on left and right sides indicates that the mobile platform is going to enter the normal cruise track, the central control system sends an instruction again to the steering engine to make the steering engine return, achieving steering reversal, when the difference between distance detected by the ultrasonic sensor A on the left side and distance detected by the ultrasonic sensor B on the right side exceeds a preset value and the value is positive, the central control system sends an instruction to the steering engine, and the steering engine is deflected to the corresponding angle according to the distance difference, making the steering system turn to the right, when the distance difference detected by the ultrasonic sensors on left and right sides indicates that the mobile platform is going to enter the normal cruise track, the central control system sends an instruction again to the steering engine to make the steering engine return, achieving steering reversal;
6. when distance detected by the ultrasonic sensor D behind the mobile platform is less than the preset safety value, it indicates that the mobile platform has retreated from the soil-bin, and the control procedure allows the mobile platform to enter the next soil-bin, completing the cruise of crops in the next soil-bin;
7. after completing one overall cruise, the mobile platform returns to the initial position to wait for the next overall cruise with countdown, and a power output port of an automatic charging device is connected with a power input port of the 12V lithium battery on the mobile platform via a set of automatic charging device for charging the electric energy of the mobile platform; and when the mobile platform detects that electric quantity is lower than a preset value during cruise, the central control system terminates the current work and controls the mobile platform to directly return to the initial position, and the automatic charging device 39 charges the mobile platform.

The advantages of the present invention are as follows:
1) According to the technical solution of the four-wheel independent suspension of the present invention, the mobile platform can effectively filter out the bump of the rugged surface, thereby reducing damage to equipment inside the mobile platform and sensor probing equipment carried on the mobile platform; for the four-wheel independent suspension, each wheel is controlled by the shock absorber with longer travel, four wheels can be in contact with the ground on the rugged greenhouse road surface, thereby achieving high stability and reducing wheel suspension for the mobile platform.

2) According to technical solutions of the arrangement of the lithium battery and the stepper motor and the model selection of the bottom plate, the bottom frame and the wheels in the present invention, the mobile platform can reduce the center of gravity, due to the large weight, the lithium battery and the stepper motor are mounted at the bottommost part of the mobile platform simultaneously, to reduce the overall center of gravity of the mobile platform; meanwhile, in case of ensuring that the mobile platform has certain ground clearance to achieve the passing ability of the mobile platform, the small-diameter wheels are selected to reduce the overall center of gravity of the mobile platform, in the model selection of the bottom support frame, the design scheme of attaching the lead plate under the square tubes into which leads are poured adopted greatly increases the dead weight of the chassis, reduces the center of gravity, improves the stability of the vehicle body, and reduces the overturn risk of the mobile platform substantially.

3) According to the technical solution of programmable control and movement platform in the present invention, the optimal cruise route is planned according to the distribution and structure of the greenhouse soil-bin, such that the smart mobile platform can automatic cruise as per the set route, collect greenhouse environment and crop growth information and transmit information to a remote control terminal; optionally, the motion of the mobile platform and the detection equipment carried on the mobile platform can be controlled manually; owing to its mobility, the mobile platform can carry out timed cruise to automatically complete the preset detection task, hence only a set of detection equipment can cover timed cruise on the environment and crop growth information of a greenhouse group constituted by one or a plurality of greenhouses, thereby substantially reducing the investments to the detection equipment and personnel, effectively avoiding the operation error of personnel, and improving the detection accuracy and operating efficiency of greenhouse environment and crop growth information.

4) According to the technical solution of the detection equipment for greenhouse environment and crop growth information in the present invention, the smart mobile platform can realize the real-time dynamic monitoring of greenhouse environment and the real-time on-line non-destructive testing of crop growth information.

5) According to the technical solution of automatic charging in the present invention, the mobile platform can complete the charging of the mobile platform through the automatic charging device, thereby solving the problem of automatic supplementation for electric energy in case of shortage of charging and electric quantity of the mobile platform in the automatic cruising process, improving the degree of automation and reducing personnel management costs.

6) According to the technical solution of the industrial control computer in the present invention, the secondary development and function expansion of the mobile platform are easy to carry out, and the mobile platform has good compatibility with the carried detection equipment.

BRIEF DESCRIPTION OF THE ACCOMPANYING DRAWINGS

To illustrate the examples and technical solutions of the present invention more clearly, the following briefly introduces the accompanying drawings required for describing the examples of the present invention and the technical solutions thereof.

In the Figures: 1. Frame; 2. Upper cantilever A; 3. Lower cantilever A; 4. Steering knuckle; 5. Shock absorber A; 6. Tire A; 7. Shock absorber support A; 8. Upper cantilever B; 9. Lower cantilever B; 10. C-shaped support; 11. Shock absorber B; 12. Tire B; 13. Shock absorber support B; 14. Stepper motor; 15. Reducer; 16. Motor support; 17. Universal coupling A; 18. Differential gear; 19. Transmission half shaft; 20. Universal coupling B; 21. Steering engine; 22. Steering track rod; 23. Ultrasonic sensor A; 24. Ultrasonic sensor B; 25. Ultrasonic sensor C; 26. Ultrasonic sensor D; 27. Camera; 28. Laser sensor; 29. Greenhouse environment and crop detection image sensor module; 30. Signal collection module; 31. Industrial personal computer; 32. Driving module; 33. Wireless transmitting and receiving module; 34. 12V lithium battery; 35. 5V power converter; 36. 6V power converter; 37. Frame suspension support; 38. Frame shock absorber support; 39. Automatic charging device; 40. initial position of mobile platform; 41. Crop; 42. soil-bin.

DETAILED DESCRIPTION OF THE EMBODIMENTS

The present invention is further described in detail below with reference to the accompanying drawings.

Figure 1:
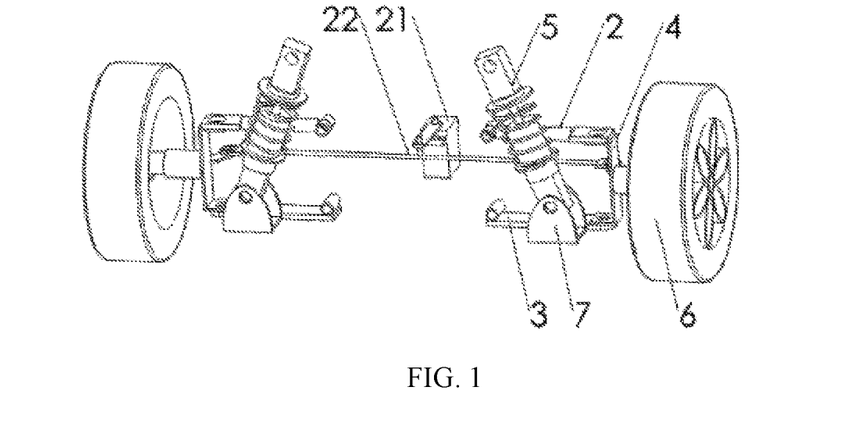
FIG. 1 is a schematic structural view of the front suspension assembly and steering system of the mobile platform in the present invention.
Figure 2:
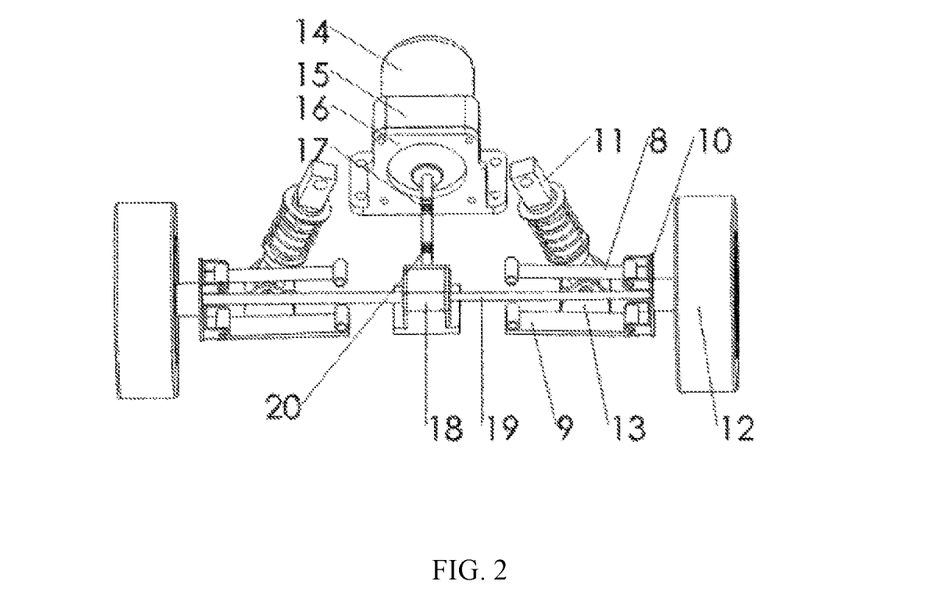
FIG. 2 is a schematic view of the rear suspension assembly, power assembly and drive assembly of the mobile platform in the present invention.
Figure 3:
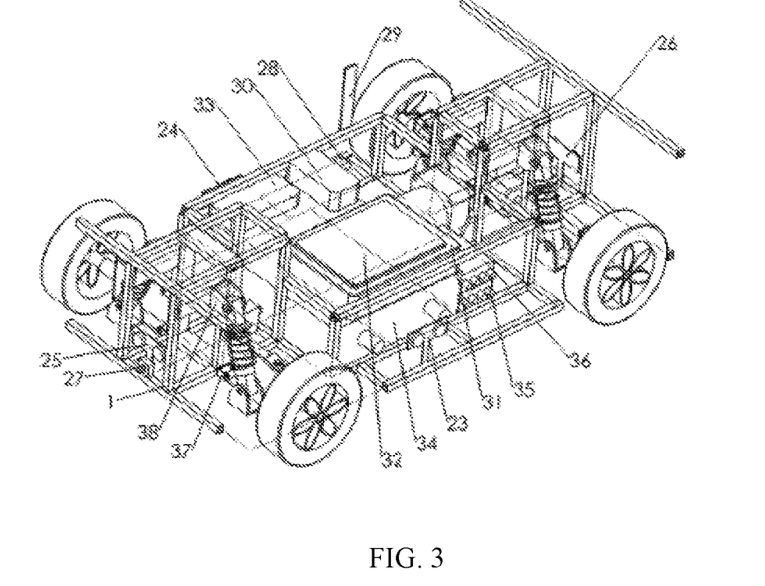
FIG. 3 is a perspective view of the mobile platform in the present invention.
Figure 4:
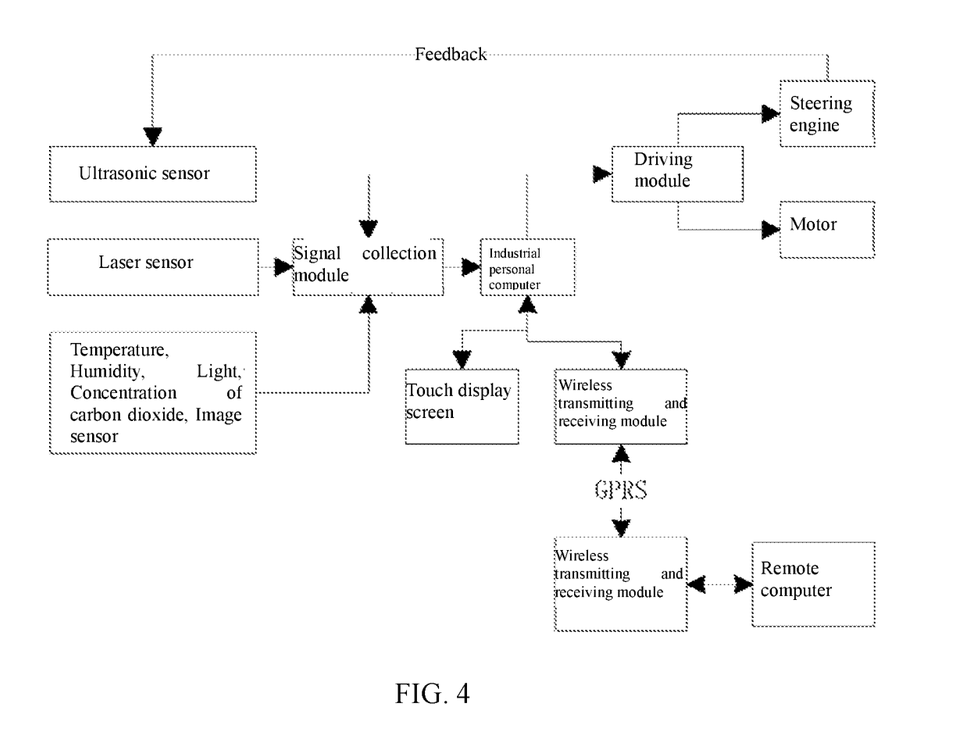
FIG. 4 is an electrical module diagram of the operation of the mobile platform in the present invention.
Figure 5:
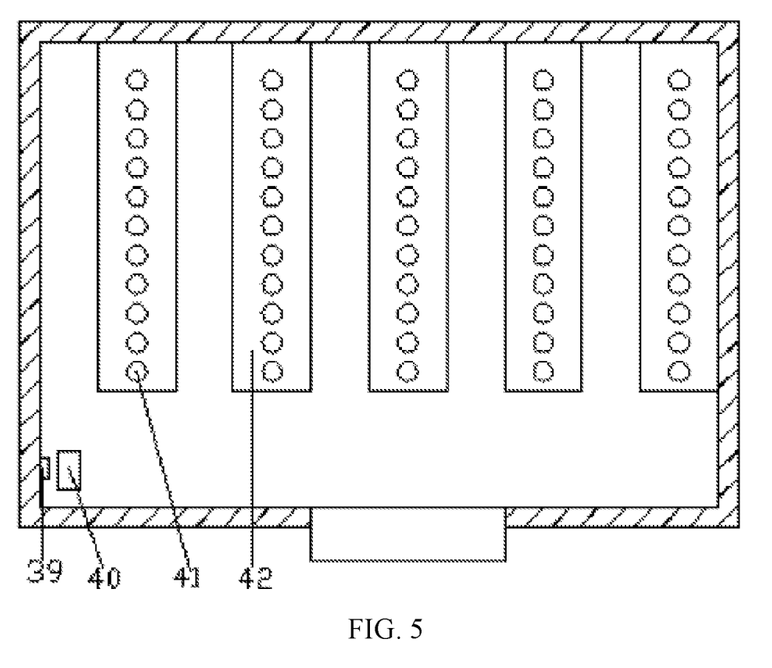
FIG. 5 is a schematic view of the greenhouse structure in the present invention.

According to an smart mobile detection platform for a greenhouse, the perspective view thereof is shown in FIG. 3; the structures of the front suspension assembly and the steering system are shown in FIG. 1, and the rear suspension assembly, the power assembly and the drive assembly are shown in FIG. 2; the working electrical module is shown in FIG. 4; and the greenhouse structure suitable for the present invention is shown in FIG. 5.

Specially, the device according to the present invention comprises a frame, a front suspension assembly, a rear suspension assembly, a power assembly and a drive assembly for driving the mobile platform to move, a steering system for controlling the steering of the mobile platform to steer, a pose-detection pose probing sensor module making the mobile platform automatically cruise, a sensor module for collecting greenhouse environment and crop images, a signal collection module for collecting a sensor signal, a central control system for controlling the motion of the mobile platform, a transmission module for transmitting information and a power module for supplying power to the whole mobile platform, wherein the frame is welded by square tubes; the front suspension assembly is arranged at a groove at the front of the frame; the rear suspension assembly is arranged in a groove at the rear of the frame; the power assembly is arranged at the rear of a middle compartment; the drive assembly is arranged in the center of the rear suspension assembly; the steering system is arranged at the front of the compartment; the automatic-cruising pose-detection sensor modules are respectively fixed at the front and the rear and on left and right sides of the frame; the greenhouse environment and the crop detection image collecting sensor module and a laser sensor are respectively fixed on the right side of the frame; the power module is fixed at the front of the compartment; the signal collection module, the central control system and the information transmission module are fixed on the power module; the central control system is respectively connected with the signal collection module, the information transmission module, the steering system and the power assembly via a data cable; the signal collection module is connected with the sensor module via a data cable; and the power supply module is respectively connected with the central control system, the signal collection module, an information transmission module, the sensor module, the steering system and the power assembly via a power cord.

The frame 1 is welded by the square tubes; the groove at the front of the frame 1 is welded with an installed frame suspension support 37 and a frame shock absorber support 38 respectively, for connecting the suspension and the shock absorber; the suspension support 37 and the shock absorber support 38 which are in welded connection with the frame are bilaterally symmetrical along the center of the width of the frame 1; the mounting positions of the frame suspension support 37 and the frame shock absorber support 38 in the groove at the rear of the frame 1 are the same as those in the groove at the front of the frame 1; an ultrasonic sensor C 25, a camera 27 and a steering engine 21 are installed inside the groove at the front of the frame 1; a 12V lithium battery 34, a 5V power converter 35, a 6V power converter 36, the signal collection module 30, an industrial personal computer 31, a driving module 32, a stepper motor 14 of the wireless transmitting and receiving module 33, a reducer 15, the greenhouse environment and crop detection image sensor module 29 are arranged at the middle compartment of the frame 1; a differential gear 18 and an ultrasonic sensor D 26 are arranged inside the groove at the rear of the frame 1; and an ultrasonic sensor A 23 and an ultrasonic sensor B 24 for preventing the mobile platform against deviation from the route are arranged on both sides of the frame 1.

The front suspension assembly comprises an upper cantilever A 2, a lower cantilever A 3, a steering knuckle 4, a shock absorber A 5 and a tire A 6; the upper cantilever A 2 and the lower cantilever A 3 are connected with the frame suspension support 37 via bolts; the steering knuckle 4 is connected with the upper cantilever A 2 and the lower cantilever A 3 respectively; the shock absorber A 5 is connected with a shock absorber support A 7 and the frame shock absorber support 38 respectively; the tire A 6 is arranged on the steering knuckle 4 and is fixed by a stepped shaft and nuts on the steering knuckle 4; a rolling bearing is arranged inside the tire A 6 so that the tire A 6 can roll; and the front suspension assembly is bilaterally symmetrical along the center of the width of the frame 1.

The rear suspension assembly comprises an upper cantilever B 8, a lower cantilever B 9, a C-shaped support 10, a shock absorber B 11 and a tire B 12; the upper cantilever B 8 and the lower cantilever B 9 are connected with the frame suspension support 37 by the bolts; the C-shaped support 10 is connected with the upper cantilever B 8 and the lower cantilever B 9 through bolts respectively; the shock absorber B 11 is connected with a shock absorber support B 13 and the frame shock absorber support 38 through the bolts; a rolling bearing is arranged in a hollow circular pipe outside the C-shaped support 10; the tire B 12 is connected with a transmission half shaft 19; and the rear suspension assembly is bilaterally symmetrical along the center of the width of the frame 1.

The power assembly comprises the stepper motor 14, the reducer 15, a motor support 16 and a universal coupling A 17; the motor support 16 is arranged on the frame 1; the stepper motor 14 and the reducer 15 are connected via the bolts to be arranged on the motor support 16; and one end of the universal coupling A 17 is arranged on an output shaft of the reducer 15.

The drive assembly comprises the differential gear 18 and a transmission half shaft 19; an input shaft of the differential gear 18 is connected with an output shaft of the reducer 15 through a universal coupling B 20; and the output shaft of the differential gear 18 is connected with the tire B 12 through the transmission half shaft 19.

The steering system comprises the steering engine 21 and a steering track rod 22; the steering track rod 22 is connected with the steering knuckle 4 through the bolts; and the steering engine 21 is connected to the center of the steering track rod 22;

The automatic-cruising pose-detection sensor module comprises an ultrasonic sensor A 23 installed on the left side of the frame, an ultrasonic sensor B 24 on the right side, an ultrasonic sensor C 25 at the front, an ultrasonic sensor D 26 at the rear, a camera 27 at the front and a laser sensor 28 installed on the right side of the frame, wherein the ultrasonic sensor A 23 on the left side and the ultrasonic sensor B 24 on the right side are used to detect distance between the left and right sides of the mobile platform and a soil-bin of the greenhouse; and when distance detected by the ultrasonic sensors on the left and right sides exceeds the set value, the central control system sends an instruction to the steering system to make the mobile platform automatically correct the movement route. The ultrasonic sensor C 25 at the front and the ultrasonic sensor D 26 at the rear are used to detect obstacles before and behind the mobile platform to achieve obstacle avoidance. The camera 27 on the front is used to transmit road surface conditions in real. The laser sensor 28 on the right side is used for detecting the positions of the crops, and a reflector is placed at the corresponding position of the crops. When receiving the reflection signal, the laser sensor 28 will trigger signal to the signal collection module 30, the central control system controls the stepper motor 14 to stop running, making the mobile platform stop, and equipment carried on the mobile platform starts to collect crop information.

The greenhouse environment and crop detection image collecting sensor module 29 comprises a temperature sensor, a humidity sensor, a light sensor, a carbon dioxide concentration sensor and a camera, for collecting greenhouse environment and crop image information.

The signal collection module 30 comprises a data collection card and a video image collection card, for collecting the sensor signal and transmitting the signal to the industrial personal computer 31.

The central control system comprises a industrial personal computer 31 and a driving module 32, the industrial personal computer 31 is connected with the driving module 32 through the data cable, which is used for controlling the movement of the mobile platform.

The information transmission module comprises two groups of wireless transmitting and receiving modules 33, the two groups of wireless transmitting and receiving modules 33 are respectively connected with the industrial personal computer 31 and a remote computer and are in wireless transmission through GPRS.

The power module includes a 12V lithium battery 34, a 5V power converter 35, and a 6V power converter 36, which convert the 12V voltage to 5V and 6V voltages respectively, the converted 5V and 6V voltages and the 12V voltage supplied by the 12V lithium battery 34 are respectively connected with electrical modules with the required 5V, 6V and 12V voltages through the power cord to provide power for the electrical part of the entire mobile platform.

The method for automatic-cruising of the integrated information of the greenhouse by the smart mobile detection platform comprises the following steps that:

1. A power button on the mobile platform is started, the system carries out self-inspection, equipment runs properly, the mobile platform starts to operate, starting from the initial position 40.
2. The mobile platform enters into a soil-bin 42 according to the preset automatic cruise planning route, the ultrasonic sensors on the left and right sides of the mobile platform simultaneously detect the distance of the mobile platform from the soil-bin on the left side and the soil-bin on the right side, when the difference between distance detected by the ultrasonic sensor A 23 on the left side and distance detected by the ultrasonic sensor B 24 on the right side exceeds a preset value and the value is negative, the central control system sends an instruction to the steering engine 21, and the steering engine 21 is deflected to the corresponding angle according to the distance difference, making the steering system turn to the right, when the distance difference detected by the ultrasonic sensors on left and right sides indicates that the mobile platform is going to enter the normal cruise track, the central control system sends an instruction again to the steering engine 21 to make the steering engine 21 return, achieving steering reversal; when the difference between distance detected by the ultrasonic sensor A 23 on the left side and distance detected by the ultrasonic sensor B 24 on the right side exceeds a preset value and the value is positive, the central control system sends an instruction to the steering engine 21, and the steering engine 21 is deflected to the corresponding angle according to the distance difference, making the steering system turn to the left, when the distance difference detected by the ultrasonic sensors on left and right sides indicates that the mobile platform is going to enter the normal cruise track, the central control system sends an instruction again to the steering engine 21 to make the steering engine 21 return, achieving steering reversal.
3. A laser reflector is arranged on the lateral surface of each crop 41 at a certain distance in the direction of travel, when the laser sensor 28 on the right side of the mobile platform receives the reflected signal, the control system sends an instruction to the stepper motor 14, making the stepper motor 14 slow down and stop running, and reversely brake to reach the preset detection position, at the same time the central control system controls detection equipment carried on the mobile platform to begin to detect the growth information of the crops. After completing a series of detection works, the detection equipment transmits the completion signal to the central control system, the central control system drives the stepper motor 14 again according to the received signal to move the mobile platform forward, when the laser sensor 28 on the right side of the mobile platform receives the reflected signal again, the mobile platform stops, and the carried detection equipment starts to detect crops to realize automatic cruise.
4. The greenhouse environment and the crop detection image sensor module 29 on the right side of the mobile platform collects temperature, humidity, light, carbon dioxide concentration and image information at the detection position when the mobile platform stops, transmits the signal through the signal collection module to the central control system, and draws the distribution map of greenhouse environmental information, providing the basis for environmental regulation and control.
5. When distance detected by the ultrasonic sensor C 25 in the front of the mobile platform is less than the preset safety value, the central control system controls the stepper motor 14 to stop operating according to the received signal, indicating that the platform has reached the detection boundary in the front and that cruise on this row of soil-bin has been completed and there are no crops 41 to be detected; and the central control system controls the stepper motor 14 to rotate reversely, making the mobile platform reverse. When the mobile platform reverses, the ultrasonic sensors on both sides of the mobile platform continue to detect distance of the left and right sides from the soil-bins, and its steering direction is exactly opposite to the forward direction, the control rule of the motion of the traveling track is opposite to that when traveling forward; when the difference between distance detected by the ultrasonic sensor A 23 on the left side and distance detected by the ultrasonic sensor B 24 on the right side exceeds the preset value and the value is negative, the central control system sends an instruction to the steering engine 21, and the steering engine 21 is deflected to the corresponding angle according to the distance difference, making the steering system turn to the left, when the distance difference detected by the ultrasonic sensors on left and right sides indicates that the mobile platform is going to enter the normal cruise track, the central control system sends an instruction again to the steering engine 21 to make the steering engine 21 return, achieving steering reversal, when the difference between distance detected by the ultrasonic sensor A 23 on the left side and distance detected by the ultrasonic sensor B 24 on the right side exceeds a preset value and the value is positive, the central control system sends an instruction to the steering engine 21, and the steering engine 21 is deflected to the corresponding angle according to the distance difference, making the steering system turn to the right, when the distance difference detected by the ultrasonic sensors on left and right sides indicates that the mobile platform is going to enter the normal cruise track, the central control system sends an instruction again to the steering engine 21 to make the steering engine 21 return, achieving steering reversal.
6. When distance detected by the ultrasonic sensor D 26 at the rear of the mobile platform is less than the preset safety value, it indicates that the mobile platform has retreated from the soil-bin 42, and the control procedure allows the mobile platform to enter the next soil-bin 42, completing the cruise of crops in the next soil-bin 42.
7. After completing one overall cruise, the mobile platform returns to the initial position 40 to wait for the next overall cruise with countdown, and a power output port of an automatic charging device 39 is connected with a power input port of the 12V lithium battery 34 on the mobile platform via a set of automatic charging device for charging the electric energy of the mobile platform; and when the mobile platform detects that electric quantity is lower than a preset value during cruise, the central control system terminates the current work and controls the mobile platform to directly return to the initial position, and the automatic charging device 39 charges the mobile platform.

The above is merely an exemplary description and helps to further understand the present invention. However, the specific details of the embodiments are merely for the purpose of illustrating the present invention and do not represent all the technical embodiments in the concept of the present invention. Hence, the present invention shall not be construed as being limited to the overall technical embodiments. Judging from some technicians, any non-substantial modifications that do not depart from the concept of the present invention, i.e., such as simple changes or substitutions to technical features with the same or similar technical effects, which are considered to be within the protection scope of the present invention.

The invention claimed is:

1. A smart mobile detection platform for a greenhouse, comprising a frame, a front suspension assembly, a rear suspension assembly, a power assembly, a drive assembly, a steering system, an automatic-cruising pose-detection sensor module, a greenhouse environment and crop detection image sensor module, a signal collection module, a central control system, an information transmission module and a power module, wherein the frame is welded by square tubes; the front suspension assembly is arranged at a groove at the front of the frame; the rear suspension assembly is arranged in a groove at the rear of the frame; the power assembly is arranged at the rear of a middle compartment; the drive assembly is arranged in the center of the rear suspension assembly; the steering system is arranged at the front of the frame; the automatic-cruising pose-detection sensor modules are respectively fixed at the front and the rear and on left and right sides of the frame; the greenhouse environment and the crop detection image sensor module and a laser sensor are respectively fixed on the right side of the frame; the power module is fixed at the front of the compartment; the signal collection module, the central control system and the information transmission module are fixed on the power module; the central control system is respectively connected with the signal collection module, the information transmission module, the steering system and the power assembly via a data cable; the signal collection module is connected with the sensor module via a data cable; and the power module is respectively connected with the central control system, the signal collection module, the information transmission module, the sensor module, the steering system and the power assembly via a power cord.

2. The smart mobile detection platform for a greenhouse according to claim 1, wherein, the frame is welded by the square tubes; the groove at the front of the frame is welded with an installed frame suspension support and a frame shock absorber support respectively, for connecting the suspension and the shock absorber; the suspension support and the shock absorber support which are in welded connection with the frame are bilaterally symmetrical along the center of the width of the frame; the mounting positions of the frame suspension support and the frame shock absorber support in the groove at the rear of the frame are the same as those in the groove at the front of the frame; an ultrasonic sensor C, a camera and a steering engine are installed inside the groove at the front of the frame; a 12V lithium battery, a 5V power converter, a 6V power converter, the signal collection module, an industrial personal computer, a driving module, a stepper motor of the wireless transmitting and receiving module, a reducer, the greenhouse environment and crop detection image sensor module are arranged at the middle compartment of the frame; a differential gear and an ultrasonic sensor D are arranged inside the groove at the rear of the frame; and an ultrasonic sensor A and an ultrasonic sensor B for preventing the mobile platform against deviation from the route are arranged on both sides of the frame.

3. The smart mobile detection platform for a greenhouse according to claim 1, wherein, the front suspension assembly comprises an upper cantilever A, a lower cantilever A, a steering knuckle, a shock absorber A and a tire A; the upper cantilever A and the lower cantilever A are connected with the frame suspension support via bolts; the steering knuckle is connected with the upper cantilever A and the lower cantilever A respectively; the shock absorber A is connected with a shock absorber support A and the frame shock absorber support respectively; the tire A is arranged on the steering knuckle and is fixed by a stepped shaft and nuts on the steering knuckle; a rolling bearing is arranged inside the tire A so that the tire A can roll; and the front suspension assembly is bilaterally symmetrical along the center of the width of the frame;

the rear suspension assembly comprises an upper cantilever B, a lower cantilever B, a C-shaped support, a shock absorber B and a tire B; the upper cantilever B and the lower cantilever B are connected with the frame suspension support by the bolts; the C-shaped support is connected with the upper cantilever B and the lower cantilever B through bolts respectively; the shock absorber B is connected with a shock absorber support B and the frame shock absorber support through the bolts; a rolling bearing is arranged in a hollow circular pipe outside the C-shaped support; the tire B is connected with a transmission half shaft; and the rear suspension assembly is bilaterally symmetrical along the center of the width of the frame;

the power assembly comprises the stepper motor, the reducer, a motor support and a universal coupling A; the motor support is arranged on the frame; the stepper motor and the reducer are connected via the bolts to be arranged on the motor support; and one end of the universal coupling A is arranged on an output shaft of the reducer;

the drive assembly comprises the differential gear and a transmission half shaft; an input shaft of the differential gear is connected with an output shaft of the reducer through a universal coupling B; and the output shaft of the differential gear is connected with the tire B through the transmission half shaft;

the steering system comprises the steering engine and a steering track rod; the steering track rod is connected with the steering knuckle through the bolts; and the steering engine is connected to the center of the steering track rod;

the automatic-cruising pose-detection sensor module comprises an ultrasonic sensor A arranged installed on the left side of the frame, an the ultrasonic sensor B on the right side, an the ultrasonic sensor C on the front, an the ultrasonic sensor D on the rear, a camera at the front and a the laser sensor installed on the right side of the frame.

4. The smart mobile detection platform for a greenhouse according to claim 1, wherein, the greenhouse environment and crop detection image collecting sensor module comprises a temperature sensor, a humidity sensor, a light sensor, a carbon dioxide concentration sensor and a camera, for collecting greenhouse environment and crop image information;
the signal collection module comprises a data collection card and a video image collection card, for collecting the sensor signal and transmitting the signal to the industrial personal computer;
the central control system comprises the industrial personal computer and the driving module; the industrial personal computer is connected with the driving module through the data cable, which is used for controlling the movement of the mobile platform.

5. The smart mobile detection platform for a greenhouse according to claim 1, wherein, the information transmission module comprises two groups of wireless transmitting and receiving modules; the two groups of wireless transmitting and receiving modules are respectively connected with the industrial personal computer and a remote computer and are in wireless transmission through GPRS.

6. The smart mobile detection platform for a greenhouse according to claim 1, wherein, the power module includes a 12V lithium battery, a 5V power converter, and a 6V power converter, which convert the 12V voltage to 5V and 6V voltages respectively; the converted 5V and 6V voltages and the 12V voltage supplied by the 12V lithium battery are respectively connected with electrical modules with the required 5V, 6V and 12V voltages through the power cord to provide power for the electrical part of the entire mobile platform.

7. The smart mobile detection platform for a greenhouse according to claim 1, wherein, the 12V lithium battery and the stepper motor are mounted at the bottommost part of the mobile platform simultaneously, 7-inch wheels are used, attaching the lead plate under the square tubes are used in the model selection of the bottom support frame.

8. A method for automatic-cruising of the integrated information of the greenhouse by the smart mobile detection platform for a greenhouse according to claim 1, comprising the following steps that:
A) a power button on the mobile platform is started, the system carries out self-inspection, equipment runs properly, the mobile platform starts to operate, starting from the initial position;
B) the mobile platform enters into a soil-bin according to the preset automatic cruise planning route; the ultrasonic sensors on the left and right sides of the mobile platform simultaneously detect the distance of the mobile platform from the soil-bin on the left side and the soil-bin on the right side; when the difference between distance detected by the ultrasonic sensor A on the left side and distance detected by the ultrasonic sensor B on the right side exceeds a preset value and the value is negative, the central control system sends an instruction to the steering engine, and the steering engine is deflected to the corresponding angle according to the distance difference, making the steering system turn to the right; when the distance difference detected by the ultrasonic sensors on left and right sides indicates that the mobile platform is going to enter the normal cruise track, the central control system sends an instruction again to the steering engine to make the steering engine return, achieving steering reversal; when the difference between distance detected by the ultrasonic sensor A on the left side and distance detected by the ultrasonic sensor B on the right side exceeds a preset value and the value is positive, the central control system sends an instruction to the steering engine, and the steering engine is deflected to the corresponding angle according to the distance difference, making the steering system turn to the left; when the distance difference detected by the ultrasonic sensors on left and right sides indicates that the mobile platform is going to enter the normal cruise track, the central control system sends an instruction again to the steering engine to make the steering engine return, achieving steering reversal;
C) a laser reflector is arranged on the lateral surface of each crop at a certain distance in the direction of travel; when the laser sensor on the right side of the mobile platform receives the reflected signal, the control system sends an instruction to the stepper motor, making the stepper motor slow down and stop running, and reversely brake to reach the preset detection position, at the same time, the central control system controls detection equipment carried on the mobile platform to begin to detect the growth information of the crops; after completing a series of detection works, the detection equipment transmits the completion signal to the central control system; the central control system drives the stepper motor again according to the received signal to move the mobile platform forward; when laser sensor on the right side of the mobile platform receives the reflected signal again, the mobile platform stops, and the carried detection equipment starts to detect crops to realize automatic cruise;
D) the greenhouse environment and the crop detection image sensor module on the right side of the mobile platform collects temperature, humidity, light, carbon dioxide concentration and image information at the detection position when the mobile platform stops, transmits the signal through the signal collection module to the central control system, and draws the distribution map of greenhouse environmental information, providing the basis for environmental regulation and control;
E) when distance detected by the ultrasonic sensor C at the front of the mobile platform is less than the preset safety value, the central control system controls the stepper motor to stop operating according to the received signal, indicating that the platform has reached the detection boundary in the front and that cruise on this row of soil-bin has been completed and there are no crops to be detected; and the central control system controls the stepper motor to rotate reversely, making the mobile platform reverse; when the mobile platform reverses, the ultrasonic sensors on both sides of the mobile platform continue to detect distance of the left and right sides from the soil-bins, and its steering direction is exactly opposite to the forward direction; the control rule of the motion of the traveling track is opposite to that when traveling forward; when the difference between distance detected by the ultrasonic sensor A on the left side and distance detected by the ultrasonic sensor B on the right side exceeds the preset value and the value is negative, the central control system sends an instruction to the steering engine, and the steering engine is deflected to the corresponding angle according to the distance difference, making the steering system turn to the left; when the distance difference detected by the ultrasonic sensors on left and right sides indicates that the mobile platform is going to enter the normal cruise track, the central control system sends an instruction again to the steering engine to make the steering engine return, achieving steering reversal; when the difference between distance detected by the ultrasonic sensor A on the left side and distance detected by the ultrasonic sensor B on the right side exceeds a preset value and the value is positive, the central control system sends an instruction to the steering engine, and the steering engine is deflected to the corresponding angle according to the distance difference, making the steering system turn to the right; when the distance difference detected by the ultrasonic sensors on left and right sides indicates that the mobile platform is going to enter the normal cruise track, the central control system sends an instruction again to the steering engine to make the steering engine return, achieving steering reversal;

F) when distance detected by the ultrasonic sensor D behind the mobile platform is less than the preset safety value, it indicates that the mobile platform has retreated from the soil-bin, and the control procedure allows the mobile platform to enter the next soil-bin, completing the cruise of crops in the next soil-bin; and G) after completing one overall cruise, the mobile platform returns to the initial position to wait for the next overall cruise with countdown, and a power output port of an automatic charging device is connected with a power input port of the 12V lithium battery on the mobile platform via a set of automatic charging device for charging the electric energy of the mobile platform; and when the mobile platform detects that electric quantity is lower than a preset value during cruise, the central control system terminates the current work and controls the mobile platform to directly return to the initial position, and the automatic charging device charges the mobile platform.

* * * * *